(12) United States Patent
Laberdure-Nedder et al.

(10) Patent No.: US 9,808,017 B2
(45) Date of Patent: Nov. 7, 2017

(54) FOOD PRODUCT WITH A MOULDED BODY

(75) Inventors: Aurelie Laberdure-Nedder, Mulhouse (FR); Jean-Philippe Rapp, Ernolsheim-Bruche (FR); Philippe Houssemand, Mulhouse (FR)

(73) Assignee: Kraft Foods R&D, Inc., Deerfield, IL (US)

( * ) Notice: Subject to any disclaimer, the term of this patent is extended or adjusted under 35 U.S.C. 154(b) by 0 days.

(21) Appl. No.: 13/345,462

(22) Filed: Jan. 6, 2012

(65) Prior Publication Data

US 2012/0219668 A1    Aug. 30, 2012

(30) Foreign Application Priority Data

Feb. 25, 2011   (EP) .................................... 11155965

(51) Int. Cl.
| | | |
|---|---|---|
| *A23G 3/54* | (2006.01) | |
| *A23G 1/54* | (2006.01) | |
| *A23G 1/00* | (2006.01) | |
| *A21B 3/13* | (2006.01) | |
| *A23G 3/34* | (2006.01) | |

(52) U.S. Cl.
CPC ............ *A21B 3/132* (2013.01); *A23G 1/0063* (2013.01); *A23G 1/54* (2013.01); *A23G 3/0025* (2013.01); *A23G 3/54* (2013.01)

(58) Field of Classification Search
CPC ........ A23G 1/54; A23G 1/545; A23G 5/0044; A23G 3/0053; A23G 3/0085; A23G 3/0091; A23G 3/0093; A23G 3/0097; A23G 3/0063; A23G 3/0072; A23G 1/0063; A23G 3/0025; A23G 3/54; A21B 3/132

USPC ....... 426/76, 89, 138, 274, 390, 93, 94, 272, 426/144, 103, 104, 658, 631, 389, 512, 426/514, 515, 297, 289, 290, 291, 292, 426/293, 294, 295, 296; 425/52, 96, 132; 249/60, 69, 92, 94, 119, DIG. 1
See application file for complete search history.

(56) References Cited

U.S. PATENT DOCUMENTS

| | | |
|---|---|---|
| 3,821,443 A | 6/1974 | Halladay |
| 4,455,333 A | 6/1984 | Hong |
| 4,503,080 A | 3/1985 | Brabbs |

(Continued)

FOREIGN PATENT DOCUMENTS

| | | |
|---|---|---|
| AU | 742590 | 1/2002 |
| BG | 103291 | 3/2001 |

(Continued)

OTHER PUBLICATIONS

Webster's ("cracker" (noun), Webster's Third New International Dictionary, Unabridged), pub. 1993.*

(Continued)

*Primary Examiner* — Viren Thakur
(74) *Attorney, Agent, or Firm* — Fitch, Even, Tabin & Flannery LLP

(57) ABSTRACT

A food product having at least one moulded body. The moulded body has a food mass and an array of baked items or a substantially centrally located baked item. At least one member of the array of baked items or the centrally located baked item form a consumable unit together with at least a portion of the moulded body. Further, at least one portion of at least one baked item is not covered with the first food mass and is visible from at least one side of the moulded body.

4 Claims, 4 Drawing Sheets

(56) References Cited

U.S. PATENT DOCUMENTS

| | | | |
|---|---|---|---|
| 4,560,562 A | 12/1985 | Schroeder | |
| 4,613,509 A | 9/1986 | Ward | |
| 4,661,359 A | 4/1987 | Seaborne | |
| 4,752,484 A | 6/1988 | Pflaumer | |
| 4,808,422 A | 2/1989 | Ward | |
| 4,911,939 A | 3/1990 | Lou | |
| 5,194,272 A | 3/1993 | Munk | |
| 5,202,137 A | 4/1993 | Duffy | |
| 5,298,273 A | 3/1994 | Ito | |
| 5,356,643 A | 10/1994 | Miller et al. | |
| 5,378,481 A | 1/1995 | Minamikawa | |
| 5,447,735 A | 9/1995 | Miller | |
| 5,520,942 A | 5/1996 | Sauer, Jr. | |
| 5,527,556 A | 6/1996 | Frippiat | |
| 5,614,237 A * | 3/1997 | Clow et al. | 426/144 |
| 5,962,059 A | 10/1999 | Pernin | |
| 6,174,559 B1 | 1/2001 | Shulman | |
| 6,197,353 B1 | 3/2001 | Shulman | |
| 6,242,021 B1 * | 6/2001 | Rooney et al. | 426/89 |
| 6,280,785 B1 | 8/2001 | Yang | |
| 6,288,179 B1 | 9/2001 | Baur | |
| 6,312,750 B1 | 11/2001 | Bonnasse-Gahot | |
| 6,395,893 B1 | 5/2002 | Heikkila | |
| 6,558,718 B1 | 5/2003 | Borek | |
| 6,592,928 B2 | 7/2003 | Makela | |
| 6,713,100 B1 | 3/2004 | Schmoutz | |
| 6,759,079 B2 * | 7/2004 | Klug et al. | 426/660 |
| 6,887,503 B1 | 5/2005 | Rasmussen | |
| 6,902,752 B1 | 6/2005 | Kitano | |
| 7,108,880 B2 | 9/2006 | Hester | |
| 7,377,381 B2 | 5/2008 | Dziaba | |
| 7,427,420 B2 | 9/2008 | Senba | |
| 7,618,666 B2 | 11/2009 | Morando | |
| 7,645,839 B2 | 1/2010 | Bastioli | |
| 7,736,681 B2 | 6/2010 | Belzowski | |
| 2001/0041200 A1 | 11/2001 | Grollet | |
| 2002/0015519 A1 | 2/2002 | Tokas | |
| 2002/0028276 A1 | 3/2002 | Rapp | |
| 2002/0142081 A1 | 10/2002 | Ream | |
| 2002/0150655 A1 * | 10/2002 | O'Donnell Kiely | 426/89 |
| 2002/0168451 A1 | 11/2002 | ODonnellKiely | |
| 2003/0007284 A1 | 1/2003 | Forbord | |
| 2003/0228397 A1 | 12/2003 | ODonnellKiely | |
| 2004/0028622 A1 | 2/2004 | Gurin | |
| 2004/0137115 A1 | 7/2004 | Leshik | |
| 2005/0089602 A1 | 4/2005 | Kvist | |
| 2005/0090625 A1 | 4/2005 | Bastioli | |
| 2006/0025584 A1 | 2/2006 | Eroma | |
| 2006/0110493 A1 | 5/2006 | Schnieber | |
| 2006/0134284 A1 | 6/2006 | Clarke | |
| 2006/0134285 A1 | 6/2006 | Schnieber | |
| 2006/0144750 A1 | 7/2006 | Dziaba | |
| 2007/0104854 A1 | 5/2007 | Foster | |
| 2007/0218165 A1 | 9/2007 | Castro | |
| 2007/0259090 A1 | 11/2007 | Taylor | |
| 2008/0020119 A1 | 1/2008 | ODonnellKiely | |
| 2008/0020120 A1 | 1/2008 | ODonnellKiely | |
| 2008/0075901 A1 | 3/2008 | Lee | |
| 2008/0166456 A1 | 7/2008 | Kortum | |
| 2008/0213435 A1 | 9/2008 | Enevold | |
| 2008/0305215 A1 | 12/2008 | Froseth | |
| 2008/0305223 A1 | 12/2008 | Cross | |
| 2009/0013664 A1 | 1/2009 | Jones | |
| 2009/0068318 A1 | 3/2009 | Cleenewerck | |
| 2009/0074919 A1 | 3/2009 | Smith | |
| 2009/0081334 A1 | 3/2009 | Schnee | |
| 2009/0092713 A1 | 4/2009 | Cleenewerck | |
| 2009/0123633 A1 | 5/2009 | Cleenewerck | |
| 2009/0169687 A1 | 7/2009 | Pierce | |
| 2009/0214715 A1 | 8/2009 | Duke | |
| 2009/0214720 A1 | 8/2009 | Almenares | |
| 2009/0232945 A1 | 9/2009 | Arsenault | |
| 2009/0285940 A1 | 11/2009 | Foehse | |
| 2009/0304871 A1 | 12/2009 | Wappling-Raaholt | |
| 2010/0196548 A1 * | 8/2010 | Mederer | 426/87 |

FOREIGN PATENT DOCUMENTS

| | | | |
|---|---|---|---|
| CA | 1236329 | 5/1988 | |
| CA | 1246386 | 12/1988 | |
| CA | 2184062 A1 | 9/1995 | |
| CA | 2213162 A1 | 3/1998 | |
| CA | 2213162 C | 12/2004 | |
| CA | 2287693 | 12/2008 | |
| CH | 521718 A * | 4/1972 | |
| CN | 1186605 | 7/1998 | |
| CN | 1095633 | 12/2002 | |
| CZ | 9702815 | 3/1998 | |
| DE | 4419969 | 12/1995 | |
| DE | 4432413 | 3/1996 | |
| EP | 217409 A2 | 4/1987 | |
| EP | 474261 A2 | 3/1992 | |
| EP | 474261 A3 | 5/1992 | |
| EP | 317899 B1 | 1/1993 | |
| EP | 547551 A1 | 6/1993 | |
| EP | 474261 B1 | 9/1994 | |
| EP | 375240 B1 | 11/1995 | |
| EP | 650671 A3 | 5/1996 | |
| EP | 547551 B1 | 11/1997 | |
| EP | 0806151 | 11/1997 | |
| EP | 806151 A2 * | 11/1997 | ............ A23G 3/00 |
| EP | 808580 A2 | 11/1997 | |
| EP | 875158 A2 | 11/1998 | |
| EP | 908100 A2 | 1/1999 | |
| EP | 0900527 | 3/1999 | |
| EP | 900527 A2 * | 3/1999 | |
| EP | 0908100 | 4/1999 | |
| EP | 808580 A3 | 6/1999 | |
| EP | 948899 A2 | 10/1999 | |
| EP | 908100 A3 | 12/1999 | |
| EP | 1040763 A1 * | 10/2000 | |
| EP | 1078577 A2 | 2/2001 | |
| EP | 689385 B1 | 5/2001 | |
| EP | 767612 B1 | 7/2001 | |
| EP | 1166635 | 1/2002 | |
| EP | 827693 B1 | 3/2002 | |
| EP | 751713 B1 | 7/2002 | |
| EP | 1064293 B1 | 9/2002 | |
| EP | 806151 B1 | 11/2002 | |
| EP | 1316615 | 6/2003 | |
| EP | 1080060 B1 | 8/2003 | |
| EP | 758198 B1 | 9/2003 | |
| EP | 1415541 A2 | 5/2004 | |
| EP | 908100 B1 | 10/2004 | |
| EP | 1197172 B1 | 12/2004 | |
| EP | 1166635 B1 | 9/2005 | |
| EP | 1360236 B1 | 11/2005 | |
| EP | 1387995 B1 | 2/2006 | |
| EP | 1524915 B1 | 3/2007 | |
| EP | 1782699 A2 | 5/2007 | |
| EP | 1832172 | 9/2007 | |
| EP | 1337156 B1 | 1/2008 | |
| EP | 1925212 | 5/2008 | |
| EP | 1481592 | 6/2008 | |
| EP | 1949796 | 7/2008 | |
| EP | 1895854 B1 | 1/2009 | |
| EP | 2044843 | 4/2009 | |
| EP | 1998628 B1 | 11/2009 | |
| EP | 2127528 | 12/2009 | |
| EP | 2151165 | 2/2010 | |
| EP | 1528862 B1 | 5/2010 | |
| EP | 2007214 B1 | 5/2010 | |
| GB | 465242 | 5/1937 | |
| GB | 549427 A * | 11/1942 | |
| GB | 2335882 | 12/2002 | |
| GB | 2432773 | 6/2007 | |
| HU | 9701486 A2 | 5/1998 | |
| HU | 9701486 A3 | 10/1998 | |
| IL | 121553 A1 | 8/2000 | |
| JP | 61195648 A * | 8/1986 | ............ A23G 1/20 |
| JP | 63301747 A * | 12/1988 | ............ A23G 1/20 |
| JP | 04-325056 A * | 11/1992 | |
| JP | 04325056 A * | 11/1992 | ............ A23G 1/00 |
| JP | 1084873 | 4/1998 | |
| JP | 11-018679 A * | 1/1999 | |

(56) References Cited

FOREIGN PATENT DOCUMENTS

| | | |
|---|---|---|
| JP | 2000139354 | 5/2000 |
| JP | 2001103901 A | 4/2001 |
| JP | 2001103902 A | 4/2001 |
| JP | 2002027916 | 1/2002 |
| JP | 2004008004 | 1/2004 |
| JP | 2004154007 | 6/2004 |
| JP | 2004344028 | 12/2004 |
| JP | 2006081447 A | 3/2006 |
| KR | 40101033 | 12/2004 |
| PL | 321882 | 3/1998 |
| PL | 323894 A1 | 6/1998 |
| PL | 188527 B1 | 2/2005 |
| RU | 2130266 C1 | 5/1999 |
| RU | 2236136 C2 | 9/2004 |
| RU | 2245050 C1 | 1/2005 |
| RU | 2245051 C1 | 1/2005 |
| RU | 2245053 C1 | 1/2005 |
| RU | 2245054 C1 | 1/2005 |
| RU | 2245056 C1 | 1/2005 |
| RU | 2246838 C1 | 2/2005 |
| RU | 2249962 C1 | 4/2005 |
| RU | 2253994 C1 | 6/2005 |
| RU | 2253995 C1 | 6/2005 |
| RU | 2253996 C1 | 6/2005 |
| RU | 2253997 C1 | 6/2005 |
| RU | 2254735 C1 | 6/2005 |
| RU | 2254738 C1 | 6/2005 |
| RU | 2271107 C2 | 3/2006 |
| WO | 8905098 | 6/1989 |
| WO | 8905099 | 6/1989 |
| WO | 9101643 | 2/1991 |
| WO | 9403077 | 2/1994 |
| WO | 9409758 | 5/1994 |
| WO | 9419960 | 9/1994 |
| WO | 9422318 | 10/1994 |
| WO | 9502339 | 1/1995 |
| WO | 9513095 A2 | 5/1995 |
| WO | 9521535 | 8/1995 |
| WO | 9525432 | 9/1995 |
| WO | 9528849 | 11/1995 |
| WO | 9534221 | 12/1995 |
| WO | 9634538 | 11/1996 |
| WO | 9702754 | 1/1997 |
| WO | 9719604 | 6/1997 |
| WO | 9841097 A2 | 9/1998 |
| WO | 9841111 | 9/1998 |
| WO | 9841112 | 9/1998 |
| WO | 9842214 | 10/1998 |
| WO | 9947532 | 9/1999 |
| WO | 9957280 A3 | 11/1999 |
| WO | 0038534 | 7/2000 |
| WO | 0059309 | 10/2000 |
| WO | 0060959 | 10/2000 |
| WO | 0241715 | 5/2002 |
| WO | 02059200 | 8/2002 |
| WO | 02059201 | 8/2002 |
| WO | 02067698 | 9/2002 |
| WO | 03005832 | 1/2003 |
| WO | 2004005227 | 1/2004 |
| WO | 2004010793 | 2/2004 |
| WO | 2004014348 | 2/2004 |
| WO | 2004016103 | 2/2004 |
| WO | 2004016116 | 2/2004 |
| WO | 2004103797 A2 | 12/2004 |
| WO | 2006091694 | 8/2006 |
| WO | 2006117274 | 11/2006 |
| WO | 2006129089 | 12/2006 |
| WO | 2006136536 | 12/2006 |
| WO | 2007090477 | 8/2007 |
| WO | 2007090869 | 8/2007 |
| WO | 2007106889 A2 | 9/2007 |
| WO | 2008037578 | 4/2008 |
| WO | 2008090203 | 7/2008 |
| WO | 2009041821 | 4/2009 |
| WO | WO 2009135661 A1 * 11/2009 ............... A23G 1/21 |
| WO | 2010015584 | 2/2010 |
| WO | 2010044736 | 4/2010 |
| WO | 2010055033 | 5/2010 |
| WO | 2012115725 | 8/2012 |

OTHER PUBLICATIONS

"Donkey Guy 10" ("S'mores", pub. online Jun. 29, 2009). http://donkey-guy-10.xanga.com/705910930/smores/.*
"JB Prince" ("Chocolate Molds"), pub. online Nov. 26, 2009. http://web.archive.org/web/20091126172932/http:/www.jbprince.com/chocolate-and-sugar-work/chocolate-molds.asp.*
"Sephra" ("Everything you wanted to know about chocolate compound coating"), Gourmet Journal, pub. Jul. 31, 2009. http://www.sephra.com/journal/everything-you-wanted-know-about-chocolate-compound-coating.*
"Kids Activities" Aug. 2009 http://web.archive.org/web/20090814081759/http://www.kidactivities.net/category/Snacks-No-Bake-Recipes.aspx.*
"Lagrange 34 Chocolate" Oct. 2007 http://cubeme.com/lagrange-34-chocolate/.*
Definition of "gap" and "interconnect." Websters New World Dictionary, Third College Edition. 1988.*
"The Daily Spud" Oct. 14, 2009 http://www.thedailyspud.com/2009/10/14/lettherebechocolateandgiveaways/.*
"Tartelette" Mar. 10, 2009 http://www.tarteletteblog.com/2009_03_01_archive.html 5/.*
"KitKat Jenga" Jan. 20, 2009 http://www.museumofplay.org/blog/playstuff/2009/01/jengajengajenga/.*
"Chocolate Roundup" May 16, 2010 http://web.archive.org/web/20100516191249/http://mykugelhopf.ch/2010/05/chocolate-roundup-5.*
"Grilled Chocolate" Aug. 20, 2009 http://blog.kingarthurflour.com/2009/08/20/baking-outside-the-box-grilled-chocolate/.*
"Everyday Celebrating" Nov. 19, 2010 http://www.everydaycelebrating.com/recipes/page/2/.*
"Catching Fireflies Blog" Dec. 2, 2008 http://web.archive.org/web/20081202184540/http://catchingfireflies.typepad.com/catching_fireflies/2008/11/homemade-heath.html.*
"Smores Cookie Recipe" May 20, 2009 http://webcache.googleusercontent.com/search?q=cache:gBgZTNnMcKgJ:sayorysweetlife.com/2009/05/would-you-like-smore-smores-recipe/+&cd=1&hl=en&ct=clnk&gl=us.*
"Weekend Eats" Jun. 25, 2010 http://www.hotandhealthymom.com/?p=1798.*
"Hershey Kiss Pretzel Sandwich" Mar. 16, 2009 http://www.mamalisa.com/blog/chocolate-hershey-kiss-pretzel-sandwich-candy-aka-grids/.*
Life's a Feast Blogpost, "Classic Tiramisu," Dec. 27, 2008 (9 pgs.).
State Intellectual Property Office of People's Republic China Search Report dated Jul. 1, 2014 for Application No. 201280020270.8 (2 pgs.).

* cited by examiner

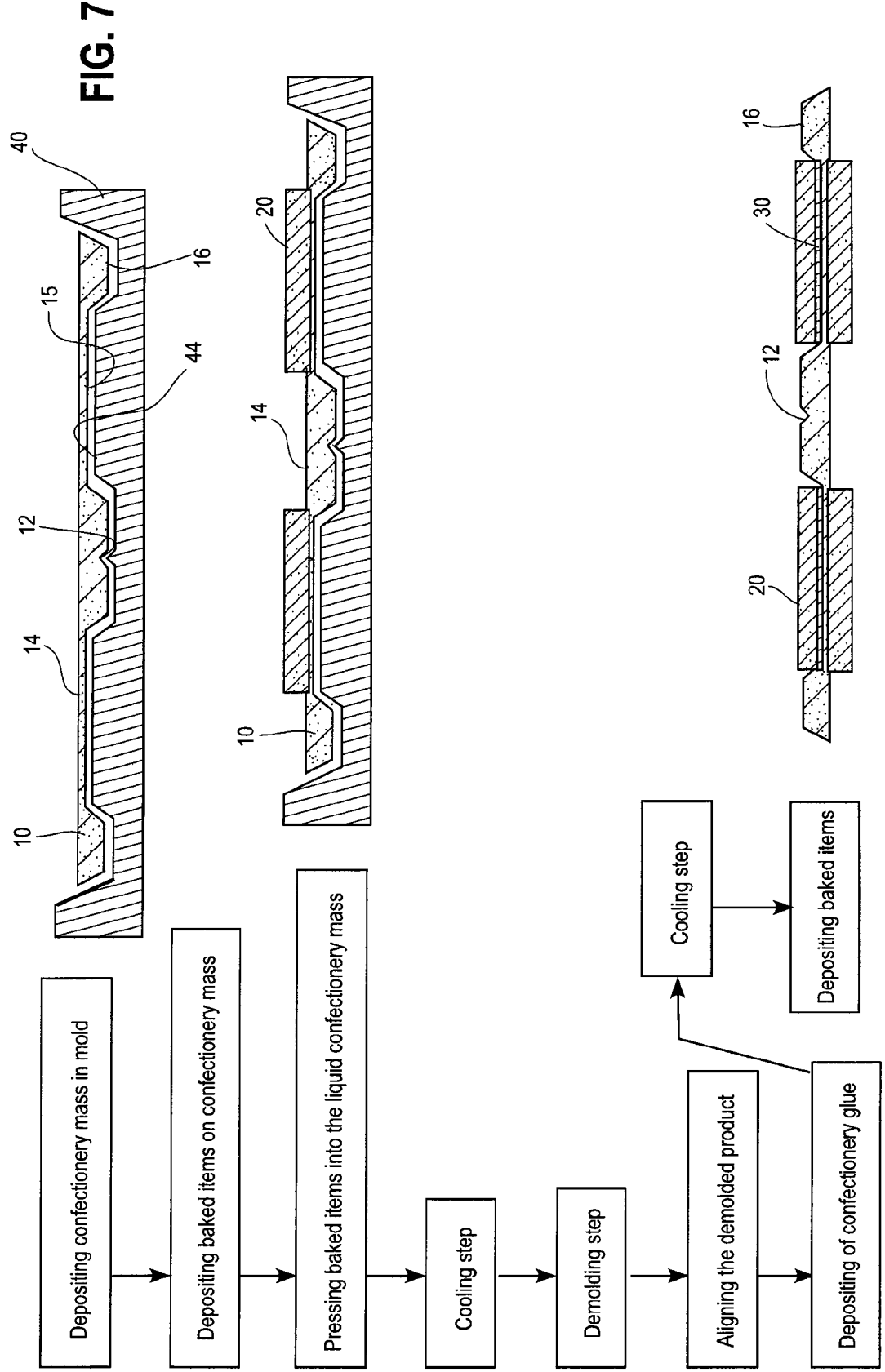

FOOD PRODUCT WITH A MOULDED BODY

CROSS-REFERENCE TO RELATED PATENT APPLICATIONS

This application claims the benefit of EP application Ser. No. 11155965.4, filed Feb. 25, 2011, which is incorporated by reference.

FIELD

The disclosure relates to a food product having a moulded body. The moulded body is made out of a food mass. In addition, the moulded body is combined with at least one baked item. The disclosure firstly defines such a food product and secondly stipulates a method for producing said food product.

BACKGROUND

Food products made by combining a food mass and a baked item are known from the prior art. Typically, such food products are composed of alternating layers of food mass and baked items. The corresponding methods to manufacture these products normally include a moulding step in which the food mass is brought into a desired shape. However, new product designs often represent new challenges for the manufacturing techniques in this field since they often ask for specific solutions so that the high quality standards of food products in terms of visual appearance, taste and nutritional value can be fulfilled.

To be successful in the marketplace, these products as well as their production often have to satisfy contradicting requirements. For example, customers have high expectancies concerning taste, consistency and visual appearance. Still, the price of these products is a very important argument in their decision to purchase. Thus, the producers of food products do not only have to provide these products with a high quality but also need the know-how to realize these high quality standards at a low cost.

Especially in case of multi-component food products, the different material properties of the components generally represent a challenge for production as well as for the durability of the desired characteristics during shelf life. More specifically, these products have to retain their characteristics over time and possibly over a wide range of temperatures.

It may also represent an incentive to create a multi-component product to facilitate its consumption. For example, EP 0 682 872 A1 discloses a food product based on an edible paste. The edible paste is based on caramelized sugar and condensed milk. It is used to produce a food product constituted of a laminar core out of that paste which is covered on its faces by a thin layer of wafer. Here, the application of wafers overcomes the negative aspects of the paste such as its stickiness by providing a solid layer that enables the use of the paste within a product so it becomes consumable for a customer.

Although EP 0 682 872 A1 manages to circumvent the stickiness of the product, another major challenge for multi-component products are the side faces on which the different components are often visible for the customer. It is of high interest that these faces keep their visual appearance during shelf life. Therefore, the multiple components, having different mechanical, chemical and thermal properties, have to be combined in a way so that, for example, relative movement between these layers does not occur. Otherwise, the visual appeal of the food product may well be negatively affected.

Further, the size of a food product is a critical design choice since the size of such a product has to appeal to a customer. Naturally, different groups of customers have divergent conceptions about the right size of such a product. Therefore, this is also an issue that has to be addressed during the design phase of a food product.

SUMMARY

An objective is therefore to provide a food product, preferably a confectionery product, with a high durability that keeps its visual appearance during shelf life. It is an aim to provide a sandwich-type food structure having a high structural integrity but matches or improves on the appearance of a standard product, e.g. a sandwich-type product. Further, the product should be produced with a production method that facilitates the production of such a product at a low cost.

The present disclosure solves the above mentioned problems by providing a food product that comprises a moulded body made out of a first food mass as well as a baked item being part of the food product. This solution is brought forward by the subject matter of the independent claims. Further embodiments are described in the dependent claims.

The food product comprises at least one moulded body. The moulded body comprises a food mass and an array of baked items or a substantially centrally located baked item. At least one member of the array of baked items or the centrally located baked item form a consumable unit together with at least a portion of the moulded body. Further, at least one portion of at least one baked item is not covered with the first food mass and is visible from at least one side of the moulded body.

Since the baked items comprise sections that are not covered with the first food mass, they are visible from at least one side when looking at the product. Further, these sections are especially fitted to be the areas that may well be used by a consumer to handle the product. More specifically, it is less likely that parts of the baked items stick to the hands of the customer than it is when touching the moulded body since the food mass of the moulded body may well start to melt. The baked items could also partly be covered with at least a second food mass or another edible product. The mass and/or the edible product could be transparent or opaque.

The meaning of the word "array" as used also covers a single row or line, forming an "ordered arrangement" of items. Other ordered arrangements that lie within the scope of the disclosure include but are not limited to matrices, curves, ordered patterns, and/or geometric shapes. However, a configuration in which baked items are deliberately placed in a disordered pattern, i.e. they are not randomly applied, is also covered by the definition of an array as used in the context of the present disclosure.

In some embodiments the moulded body comprises a geometrical shape configuration or outline, such as a circle, oval, square, rectangle etc. and may match the shape of configuration of the baked item or match the pattern made by the array of baked items.

In a further embodiment, the moulded body of a consumable unit is at least partially extending beyond the periphery of at least one baked item. In this embodiment a gap is present between the periphery of the at least one baked item and the boundary of the consumable unit. This results in a food product in which the peripheries of the baked items and the moulded body, respectively, the moulded body of a consumable unit can be positioned in respect to each other in various ways. Besides the section where the moulded body at least partially extends beyond the baked items, there may also be sections, where the baked items extend beyond the moulded body and/or sections, where the borders of each are aligned so that the peripheries of the moulded body and the items form a continuous surface. Preferably, the moulded body extends beyond the baked items in a direction parallel to the top or bottom surface of the baked items. The extent to which the periphery of a moulded body extends beyond a baked item ranges preferably between 5% and 25%, more preferably between 10% and 20%.

Combining the moulded body and the baked items as described above has the advantage that the ratio between the amount of the food mass and the at least one baked item can freely be chosen in order to achieve a desired taste and/or visual appearance. For example, since the moulded body extends at least in parts beyond the baked item, it is possible to put an emphasis on the taste of the food mass instead of the baked item. Advantageously, by extending the moulded body beyond the periphery of the baked item, such an emphasis can be achieved without having to increase the thickness of the moulded body so that the product has a slimmer look. Depending on which of the products plays a more dominant role in the all-over properties of the product, e.g. taste or design, the food product may well be considered as being a biscuit, a candy or a savoury product. It is also within the scope of the disclosure that the extending food mass may also serve as protection for the baked items. To put it differently, the moulded body extending beyond the baked items will prevent the baked items from being crushed or damaged. Consequently, in such an embodiment, the moulded body is preferably intended to provide the major share of structural integrity to the product.

In another embodiment, the at least one baked item is arranged on each side of at least one pair of opposing sides (14, 16) of the moulded body portion of a consumable unit. Thus, it is within the scope of the disclosure to place one or more baked items on several pairs of opposing sides. However, preferably, the baked items are provided on the top and the bottom side of a moulded body or a portion of the moulded body forming a consumable unit. Here, at least one of the top and bottom surfaces of a moulded body has the biggest surface fraction in relation to the all-over surface of the baked item.

Since at least one baked item is provided on each side of at least one pair of opposing sides of the moulded body portion of a consumable unit, they may well serve as support for the consumer in order to subdivide the food product into at least two parts by exerting force, i.e. a bending moment, on said food product. The smallest piece, resulting from such a subdivision, has preferably the size of a consumable unit. However, the pieces broken off may well be bigger or smaller than that size.

Concerning the subdivision of the food product, a function of an array of baked items in respect to the moulded body may also be the formation of a gap between at least some of the baked items. Preferably, such a gap has a shape so that when applying a bending moment, breakage occurs at the gap. In other words, the material properties and/or the design of the gap lead to structurally weaker sections in respect to the sections comprising the baked items. Preferably, the gaps have a maximum width that at maximum corresponds to the largest dimension of a baked item.

Such gaps can also at least partly be formed between the baked items by making use of their shape. For example, disk-shaped baked items, even if densely packed, will always form gaps. In addition, the resulting irregular gaps have the advantage that geometric inaccuracies of these gaps due to inaccurate positioning of the baked items are less visible than if the gaps are formed between straight parallel edges of the baked items.

In another embodiment, the at least one baked item comprises at least top and bottom surfaces. Further, at least a part of the top or bottom surface of the at least one baked item is visible from at least one side of the moulded body.

The part of the top or bottom surface of a baked item visible is at least 25%, preferably 35% and even more preferred 50% of the surface area of the bottom or top surface of the baked item. Here, at least one of the top and bottom surfaces of a baked item has the biggest surface fraction in relation to the all-over surface of the baked item. Preferably, the visible part at least comprises the central portion of the top or bottom surface of a baked item. Making at least parts of the top or bottom surface of a baked item visible only requires this section of the baked item to be visually appealing to the customer. The rest of the surface can be designed according to functional aspects, e.g. to achieve a good connection between the food mass and the baked item, and/or in a more simple way. This improves the quality of the product and/or reduces the cost of production.

In another embodiment, the consumable unit has predetermined breaking points that are preferably in the form of gaps or grooves at the surface of the moulded body and/or apertures. Preferably, these grooves are running straight along at least parts of the surface of the moulded body of a consumable body. In some embodiments, the breaking points are formed between adjacent consumable units so that the subdivision of the product is in fact a separation of consumable units. In any case, the grooves, gaps and/or apertures form notches that reduce the effort needed to break the food product apart.

Further, the grooves cause the food product to break in a predetermined way so that its subdivision results in pieces having a desired size and shape, preferably the smallest piece being a consumable unit. The predetermined breaking points also prevent pieces of the food mass chipping off in an undesirable way and for example causing stains on the customers' clothing. In addition, breaking points such as the aforementioned grooves facilitate that the breaking edges may still have an appealing look.

In some embodiments there is at least one baked item on each individual piece of a product, preferably centrally located. Such a piece is defined by its predetermined breaking points. However, it is also within the scope of the disclosure that instead of one baked item, an individual piece comprises an array of baked items. Naturally, a combination of these embodiments is also possible.

In a further embodiment, at least one baked item is arranged so as to be in direct contact with the moulded body. In this embodiment, the food mass of the moulded body itself and/or the material of the baked items forms an interconnecting interface between the baked items and the moulded body. Some or all baked items may also be attached to the moulded body by using confectionery glue. Preferably, the confectionery glue may be a filling that comprises fat and sugar, chocolate, a mixture of chocolate and pieces of biscuits and/or the food mass used for the moulded body.

By combining the baked item and the moulded body with confectionery glue, they are firmly attached to each other. This is especially important in view of the separation of the food product into multiple pieces since it is not desirable that during the application of force, an unintentional delamination of the moulded body and a baked item occurs. In other words, the attachment of the baked items to the moulded body by using the techniques of this embodiment provides a durable connection between these two. However, the confectionery glue of the latter technique may also provide an interface that allows shearing of the baked items if this is part of the desired customer's experience when consuming the food product.

In yet another embodiment, at least one baked item is arranged at a side face of the moulded body. In this embodiment, the at least one baked item is partially integrated into the moulded body, i.e. the food mass partially overlaps with the baked items, and/or the baked item is placed within a cavity formed into the moulded body. Like in the previous embodiments, the baked item is preferably positioned at the top or bottom side of the food product.

If being arranged at a side face of the moulded body without any overlap, shear forces between the baked items and the moulded body are exclusively transferred between the side of the baked item and the moulded body facing each other. Nonetheless, this may well be desirable for the customer if one of the positive characteristics of the product is shearing off the baked items before consumption, for a more enjoyable experience. On the other hand, integrating the baked item partly into the moulded body will enhance the durability of the connection between the moulded body and the baked item, making the food product more robust and therefore less likely to be damaged during transportation, storage and/or consumption. If the baked item is integrated, the overlap between the food product and the baked item is preferably less than 30% of the height of the baked item more preferably 20%, wherein the height of the product is the dimension of the baked item perpendicular to the side facing the moulded body. In any case, it is also within the scope of the disclosure that at least some of the baked items are completely integrated within the moulded body so that their surface partially becomes part of the surface of the moulded body or is even situated beneath the surface of the moulded body.

In another embodiment, the food mass is preferably sugar and fat based and comprises chocolate, caramel and/or compounds. The chocolate may be a dark chocolate, a milk chocolate or a white chocolate. A dark chocolate comprises cocoa liquor and/or powder and sweetener, a milk chocolate comprises cocoa liquor and/or cocoa powder, sweetener and milk solids and a white chocolate comprises cocoa butter and sweetener. In a particular embodiment, the chocolate composition is a milk chocolate composition.

The chocolate comprises at least one fat. The fat may be cocoa butter, butterfat, a cocoa butter equivalent (CBE), a cocoa butter replacer (CBR), a vegetable fat that is liquid at standard ambient temperature and pressure (SATP, 25° C. and 100 kPa) or any combination of the above. In a particular embodiment, the chocolate comprises cocoa butter.

CBE's are defined in Directive 2000/36/EC as complying with the following criteria:
a) they are non-lauric vegetable fats, which are rich in symmetrical monounsaturated triglycerides of the type POP, POSt and StOSt;
b) they are miscible in any proportion with cocoa butter, and are compatible with its physical properties (melting point and crystallisation temperature, melting rate, need for tempering phase);
c) they are obtained only by the processes of refining and/or fractionation, which excludes enzymatic modification of the triglyceride structure.

Suitable CBE's include illipe, Borneo tallow, teng-kawang, palm oil, sal, shea, kokum gurgi and mango kernel. CBE's are usually used in combination with cocoa butter. In one embodiment, the chocolate composition comprises no more than 5 wt % CBE's.

The chocolate may comprise a cocoa butter substitute (CBS) (sometimes known as a cocoa butter replacer, CBR) in place of some or all of the cocoa butter. Such chocolate compositions are sometimes known as compound chocolate (or "compounds" as hereinabove stated). Suitable CBS's include CBS laurics and CBS non-laurics. CBS laurics are short-chain fatty acid glycerides. Their physical properties vary but they all have triglyceride configurations that make them compatible with cocoa butter. Suitable CBS's include those based on palm kernel oil and coconut oil. CBS non-laurics consist of fractions obtained from hydrogenated oils. The oils are selectively hydrogenated with the formation of trans acids, which increases the solid phase of the fat. Suitable sources for CBS nonlaurics include soya, cotton-seed, peanut, rapeseed and corn (maize) oil.

The chocolate may comprise at least one vegetable fat that is liquid at standard ambient temperature and pressure (SATP, 25° C. and 100 kPa). A liquid vegetable fat may be employed when a liquid chocolate composition is desired. Suitable vegetable fats include corn oil, cotton seed oil, rapeseed oil, palm oil, safflower oil, and sunflower oil.

The present disclosure is further applicable to chocolate in which some or all of the fat is constituted by a partly or wholly non-metabolisable fat, for example Caprenin.

The chocolate comprises at least one sweetener. Such sweeteners include sugars (e.g. sucrose, dextrose, glucose syrup solids, fructose, lactose and maltose and any combination thereof), sugar alcohols (e.g. sorbitol, xylitol, erythritol, mannitol, lactitol, isomalt and maltitol, or any combination thereof), intense sweeteners (e.g. aspartame, acesulfame-K, cyclamates, saccharin, sucralose, neohesperidin, dihydrochalone, alitame, stena sweeteners, glycyrrhizin, or any combination thereof) and any combination of sugars, sugar alcohols and intense sweeteners. In one embodiment the chocolate comprises sucrose.

Further, savoury-type of food masses, such as cheese, may also be used to make a food product. By combining more than one type of food mass for the food product, it is possible to create a higher variety of tastes as well as to fine-tune the taste of the product in order to closely match the preferences of the customers. Therefore, in some embodiments there is more than one food mass making up the moulded body, e.g. dark and milk chocolate layers, chocolate and caramel layers, different types of cheese layers etc. The food mass may also comprise particular ingredients such as nuts, to adjust its flavour. In addition, by choosing one of the above options for a food mass, it becomes easier to influence the all-over material properties of the moulded body. This is relevant to the design of the product since it provides an additional option in order to achieve the desired properties of the food product. For example, by choosing the appropriate food mass or compound thereof, the moulded body may provide the structural stability to the food product.

In some embodiments the moulded body comprises a moulded chocolate body or a moulded cheese body. The moulded chocolate body may comprise inclusions such as nuts, fruit, candy, mint chips, chocolate chips, cereal pieces, biscuit pieces, caramel pieces or the like, for example, and may be an aerated moulded chocolate body in some embodiments. In some embodiments the moulded cheese body may comprise inclusions such as herbs, vegetable pieces, spices, meat pieces, poultry pieces, fruit, nuts, biscuit or cereal pieces and the like, for example.

In another embodiment, the at least one baked item comprises biscuits, waffles, soft cakes and/or crackers. At least some of the baked items may have a smooth or structured surface. At least some of the baked items of the food product may have the same shape and/or size, preferably having a disk-shape or a rectangular shape. However, they may also have any other geometric shape. Further, the baked item may be seasoned, dry, soft, extruded, filled and/or sandwiched. It is also possible that a mixture of such baked items is used to form a compound with the moulded body. In some embodiments, the baked item itself is a compound structure comprising alternating layers of baked material and non-baked material, e.g. in an embodiment, where a sandwich biscuit is located within the moulded body.

Baked items having the same shape and/or size may on one hand be optically more appealing to the customer and on the other hand simplify the production of the food product by making the handling of the baked items during production less complex.

Using biscuits and/or waffles as the baked item provides another design option for the food product in order to possess the most advantageous properties for commercial success. This also includes the biscuits and/or waffles having a smooth or structured surface that on one hand may increase the incentive to buy and on the other hand may have a positive structural effect when combining the moulded body with the baked items. In the latter case, the structured surface can deliver an improved interface between the food mass and a baked item.

In another embodiment, at least one surface of the baked item facing the moulded body is at least partially visible through gaps, formed into the moulded body, preferably the top and/or bottom surface.

Thus, this visual effect is achieved by forming gaps or apertures within the moulded body through which a surface of a baked item, although partially facing the moulded body, is still visible. On top of this advantageous optical effect of such a gap or aperture, the gap can serve as a predetermined breaking point as described above. The visible part of a baked item is at least 25%, preferably 35% and even more preferred 50% of the surface area of the bottom and/or top surface of the baked item. Preferably the central area of the surface is included in the visible part.

A method for producing the described food product comprises several steps. In one step, at least a first food mass is deposited in a mould to form at least one moulded body. Further, during the production process, at least one baked item is combined with the moulded body so that a portion of the at least one baked item id not covered with the first food mass. Further, the food mass is cooled after its deposition in the mould. Another step after the moulding process is demoulding the food product.

In another embodiment, a consumable unit is formed comprising at least a portion of the moulded body and a member of an array of baked items or a substantially centrally located baked item. In such a consumable unit the moulded body is formed so that at least a portion of the moulded body of a consumable unit is at least partially extending beyond the periphery of at least one baked item so that a gap is present between the periphery of the at least one baked item and the boundary of the consumable unit. Since in such an embodiment the moulded body and the baked items do not have to be or at least not completely be aligned at their peripheries, arranging the array of baked items or the substantially centrally located baked item on the moulded body becomes less prone to inaccuracies during the positioning of the products.

Further, production becomes less complex because shrinkage of the baked items and/or the food mass has less influence on the appearance of the food product, for example, due to a drop in temperature after production. While the food mass is cooling down after being deposited in the mould, its volume may change due to thermal expansion and causes a relative movement between the peripheries of the moulded body and the baked items. If this is not accurately taken into account during production, a misalignment at the periphery will occur, which may then cause an undesirable disturbance to the eye of the customer. Therefore, another effect of the present production method is that it also saves time during the start of a production run, since determining the right dose of food mass to be deposited in the mould does not have to be as accurate as for a completely aligned product. In addition, changes in dose occurring during production have less impact on the quality of the food product.

In another embodiment, the method for producing a food product further comprises the step of bringing at least one baked item into contact with the liquefied food mass forming the moulded body in order to create an interconnecting interface between the baked item and the food mass. Using the food mass of the moulded body as the interconnecting interface has the advantage that no confectionery glue has to be added to the food product and adverse effects, for example, on the taste or consistency of the product are avoided. Further, there is no need for additional equipment to deposit the confectionery glue.

In another embodiment, at least one baked items is placed in the mould before depositing the food mass and/or the at least one baked item is arranged on the moulded body after the food mass is at least partially solidified.

By placing at least one baked item in the mould before depositing the food mass, forming the moulded body and combining it with the baked item is done in a single production step. On the other hand, at least one baked item could also be arranged at the moulded body after the food mass is at least partially solidified or pre-crystallized. In both cases the food mass does not only form the moulded body but also forms the interface that fixes the baked item to the moulded body after solidification of the food mass, resulting in the same advantages as for the previous embodiment.

Another embodiment further comprises the step of applying heat to liquefy the surface of the at least partially solidified moulded body before arranging the baked item thereon. Again, the advantage is that the food mass also forms the interconnecting interface with the at least one baked item. However, in the technique of this embodiment, the baked item can still be combined with a moulded body after the food mass is solidified.

In another embodiment, the production method further comprises the step of arranging the at least one baked item on the moulded body by applying confectionery glue to the moulded body and/or the baked item.

By using confectionery glue to attach the at least one baked item to the moulded body, the properties of the interface are not dependent on the properties of the food mass. This might be for example desirable if the customer wishes to shear off the baked item during consumption for a more enjoyable experience. Further, it is possible to introduce an additional flavour to the food product or achieve desirable optical effects by applying an additional colour to the product. However, the food mass forming the moulded body may also be used as confectionery glue in this embodiment. This aspect may also be combined with one of the previously described methods to combine the moulded body with a baked item.

In another embodiment, pressure is applied to the at least one baked item while attaching the baked item to the moulded body. This production step may be used any of the aforementioned techniques, i.e. combining the baked items with the moulded body by using the first food mass and applying confectionery glue to attach them to each other. In any case, this production step enables a durable attachment of a baked item to the moulded body.

In another embodiment, the method for producing food products is characterized in that a cooling step is applied after arranging the at least one baked item at the moulded body. This accelerates the formation of the interface between the baked item and the moulded body and therefore speeds up the production process.

In another embodiment, the method for producing food products is characterized in that the mould has depressions and/or protrusions to pre-form at least parts of the moulded body so that the at least one baked item can be received therein. Such a mould facilitates the arrangement of a baked item in a cavity of the moulded body or even inside the moulded body. In the latter case, the baked items are placed on protrusions situated inside the mould. After depositing the food mass in at least one production step before and/or after arranging the baked items results in a food product, in which the baked items are either arranged at a side or inside the food product while still being visible from the outside.

BRIEF DESCRIPTION OF THE FIGURES

FIG. 7 shows a sequence of production steps in order to produce the food product of to the present disclosure.

Reference signs in the Figures point to equal or functionally equal items as long as not specified otherwise.

DETAILED DESCRIPTION OF PREFERRED EMBODIMENTS

Figure 1:
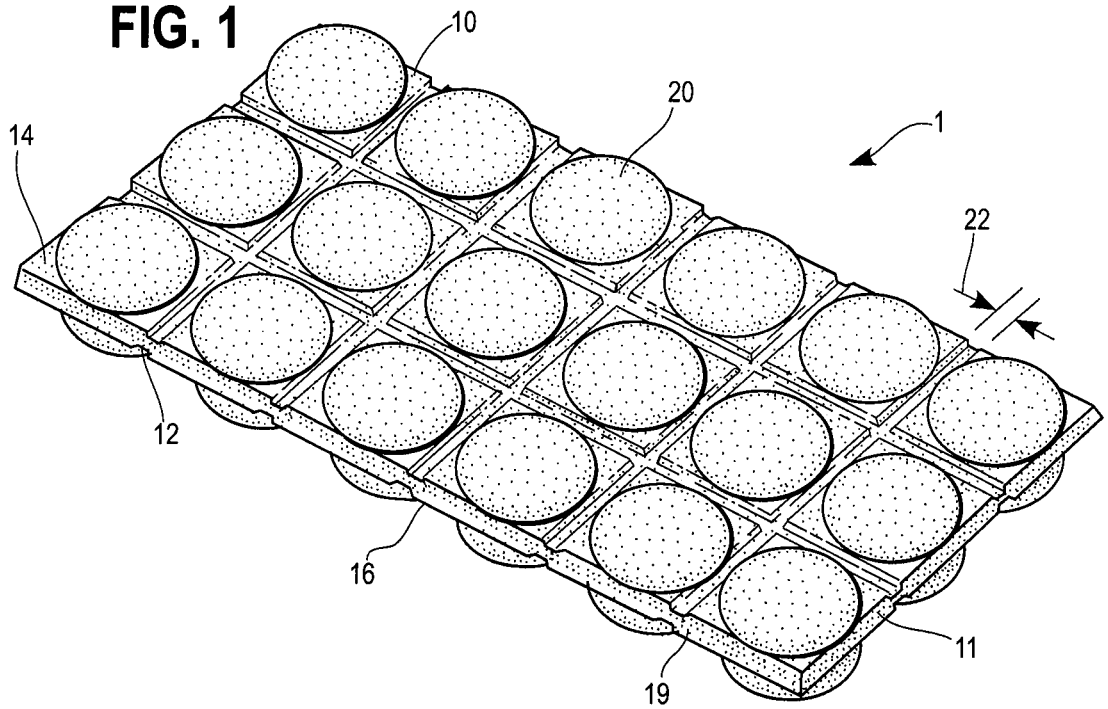
FIG. 1 shows a food product according to the present disclosure.

FIG. 1 shows one embodiment of a food product 1. The food product 1 comprises a plurality of disk-shaped baked items 20, arranged at opposite sides of a moulded body 10 having a rectangular shape. More specifically, the baked items 20 are arranged in an array on opposing side surfaces (14, 16) of the moulded body 10. Further, the moulded body has predetermined breaking points in the form of grooves 12. The grooves 12 are arranged so that the product can be subdivided into smaller pieces, wherein a smallest piece, respectively unit, comprises two baked items 20 with a rectangular-shaped piece of the moulded body 10 positioned in between. Subdividing the food product 1 into multiple pieces may be done by applying a bending moment, preferably using the baked items 20 as support. Between the baked items 20, positioned at the same side face, gaps 22 are present that separate the baked items 20 at a distance from each other.

The baked items 20 shown in FIG. 1 are either aligned with a peripheral edge 11 of the moulded body 10 or are placed apart from an outer edge 19 so that the moulded body 10 is extending beyond the baked items 20. Nonetheless, in the present embodiment the moulded body 10 mostly extends beyond the baked items 20. In this embodiment, two opposing baked items and a portion of the moulded body situated in between may be considered as a consumable unit.

Further, the baked items 20 in FIG. 1 have a structured surface and the moulded body 10 has a smooth appearance with the exception of the grooves 12 formed therein. Although not shown in FIG. 1, the baked items 20 may be joined with the moulded body 10 using confectionery glue or the food mass of the moulded body 10 itself. Although the baked items in this embodiment are placed on the side faces (14, 16) of the moulded body 10, another option is to partially integrate the baked items 20 within the food product 1 resulting in an overlap of preferably between 5% and 30% of their height.

Figure 2:
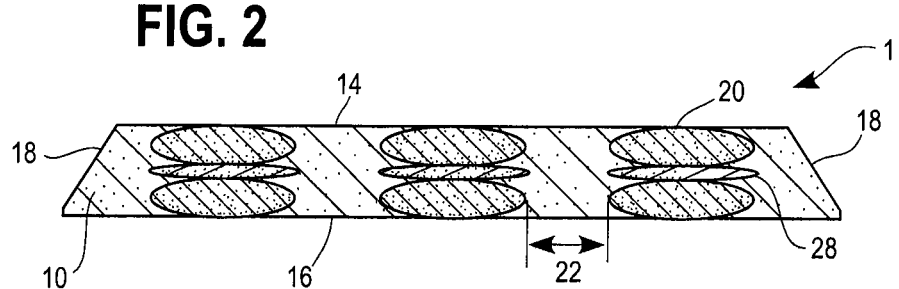
FIG. 2 shows another food product according to the present disclosure.

Another embodiment of the food product 1 is shown in FIG. 2. Here, the baked items 20 are fully integrated into the moulded body 10. However, parts of the baked items 20 are not covered with food mass and are therefore visible as baked items 20 forming a continuous surface with a side face of the moulded body 10. As shown in FIG. 2, the baked items 20 are arranged on opposite side faces of the moulded body 10. In between two adjacent baked items 20 another edible product 28 is placed. In other words, the baked item in this embodiment has a sandwich structure, preferably adding an additional flavour, consistency or structural property to the food product. These aspects provide further design options to increase the attractiveness of said food product 1. The gaps 22 formed in between the baked items 20, arranged on either side of the moulded body 10, may further represent predetermined breaking points based on different material properties of the baked items 20 and the food mass, preferably causing the moulded body to break in order to subdivide the food product 1 into multiple pieces.

Further, it is also within the scope of the disclosure to place a predetermined breaking point either on a face of the moulded body 10 or the baked items 20. Although the side faces of the moulded body 10 of FIG. 2 are forming an angle of approximately 45° in respect to the side face 16, any other angle is also within the scope of the present disclosure as well as any other geometric shape that may be used to form the side faces 18 of the food product 1 or moulded body 10.

Figure 3:
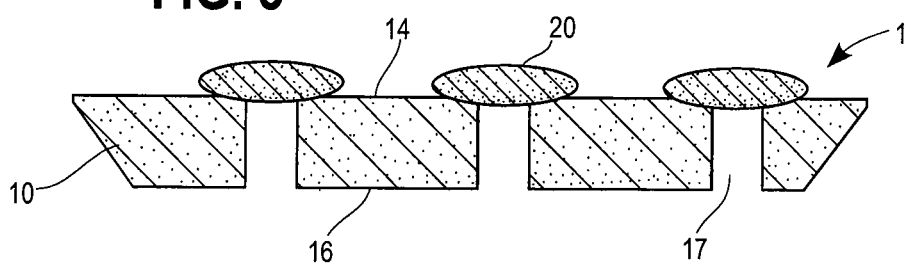
FIG. 3 shows another food product according to the present disclosure.

The food product 1 according to the embodiment shown in FIG. 3 comprises gaps or apertures 17. This configuration facilitates that the baked item's surface facing the moulded body is visible from the side 16 of the moulded body being opposite to the side 14. In this embodiment, the gaps or apertures 17 may also serve as predetermined breaking points in order to subdivide the food product 1 into multiple pieces for consumption.

Figure 4:
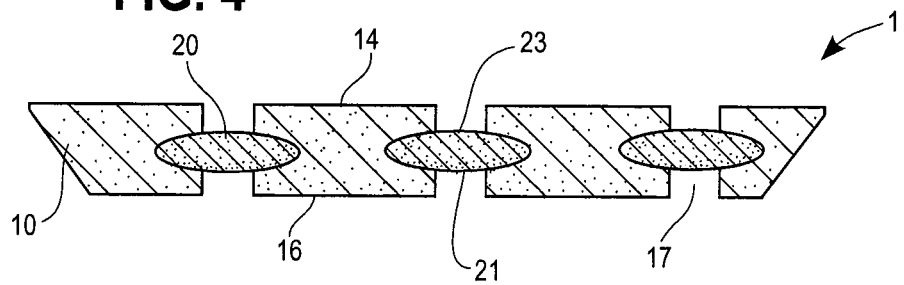
FIG. 4 shows another food product according to the present disclosure.

The food product shown in FIG. 4 is similar to the one shown in FIG. 3. However, in this embodiment the baked items 20 are arranged inside the moulded body 10. Further, the bottom face 21 and the top face 23 are both visible through gaps or apertures 17. However, it is also within the scope of the disclosure to have the baked item 20 inside the moulded body 10, wherein only the top side 23 or the bottom side 21 is showing through the gaps or apertures 17.

Figure 5:
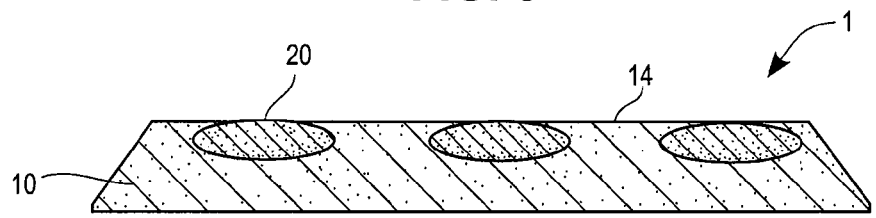
FIG. 5 shows another food product according to the present disclosure.

The embodiment of a food product 1 shown in FIG. 5 is similar to the embodiment shown in FIG. 2. However, in this embodiment, the baked items 20 are only situated at one side of the moulded body 10. Like in the embodiment shown in FIG. 2, the surface of the baked items 20 is partially forming the side face 14 of the food product 1 since the baked items 20 are fully integrated within the volume of the moulded body 10.

Figure 6:
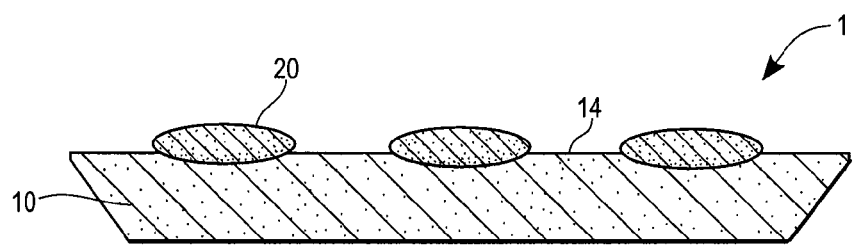
FIG. 6 shows another food product according to the present disclosure.

FIG. 6 shows another embodiment of the food product 1 according to the present disclosure having a structure similar to the one of the embodiment shown in FIG. 3. However, the moulded body 10 is continuous, i.e. it has no gaps or apertures 17 in relation to the embodiment shown in FIG. 3. The baked items 20 are arranged at only one side face 14 of the moulded body 10, wherein a portion of the baked items 20 is integrated within said moulded body 10. Consequently, the moulded body 10 and the baked items 20 overlap with each other, preferably between 5% and 30% of the over-all height of the baked items 20%.

Although FIGS. 2 to 6 show embodiments in which the baked items 20 are directly in contact with the moulded body 10, alternatively, confectionery glue 30 may be used to attach at least some of said baked items 20 to the moulded body 10. Further, the embodiments shown in FIGS. 1 to 6 comprise arrays of baked items. Naturally, each of these embodiments may also only comprise a centrally located baked item with a moulded body that represents a so-called bite-sized product.

FIG. 7 shows a method to produce a food product 1 according to the present disclosure. In a first step, food mass is deposited in a mould 40. On top of forming the outer shape of the moulded body 10, the mould 40 in FIG. 7 additionally forms a groove 12 at one side face of the food product 1 which may serve as a predetermined breaking point as described above. Further, the moulding process forms a cavity 15 into the side face 16 of the moulded body 10 due to protruding plateaus 44 being part of the mould 40.

In a next step, while the food mass is at least partially still liquid, baked items 20 are deposited on the upper side surface 14 of the moulded body 10 so that the liquid food mass of the moulded body 10 forms an interface with the baked items 20 so that they form a composite product. In a subsequent step, the food product 1 is cooled down in order to accelerate the solidification of the food mass. Afterwards, the solidified moulded body 1 with the baked items attached to is demoulded. The demoulded food product 1 is then aligned for further processing, e.g. on transporting means such as a conveyer belt or a tray.

Confectionery glue 30 is deposited on the side face 16 opposite to the side face 14 to which baked items 20 are already attached. On top of the deposited confectionery glue 30 baked items 20 are placed, preferably under application of some pressure, so that the confectionery glue 30 forms an interface, interconnecting the baked items 20 and the moulded body 10. In order to accelerate the solidification process of the confectionery glue 30, the latter assembly step of the food product 1 and the baked products 20 is followed by another step of cooling.

Figure 8:
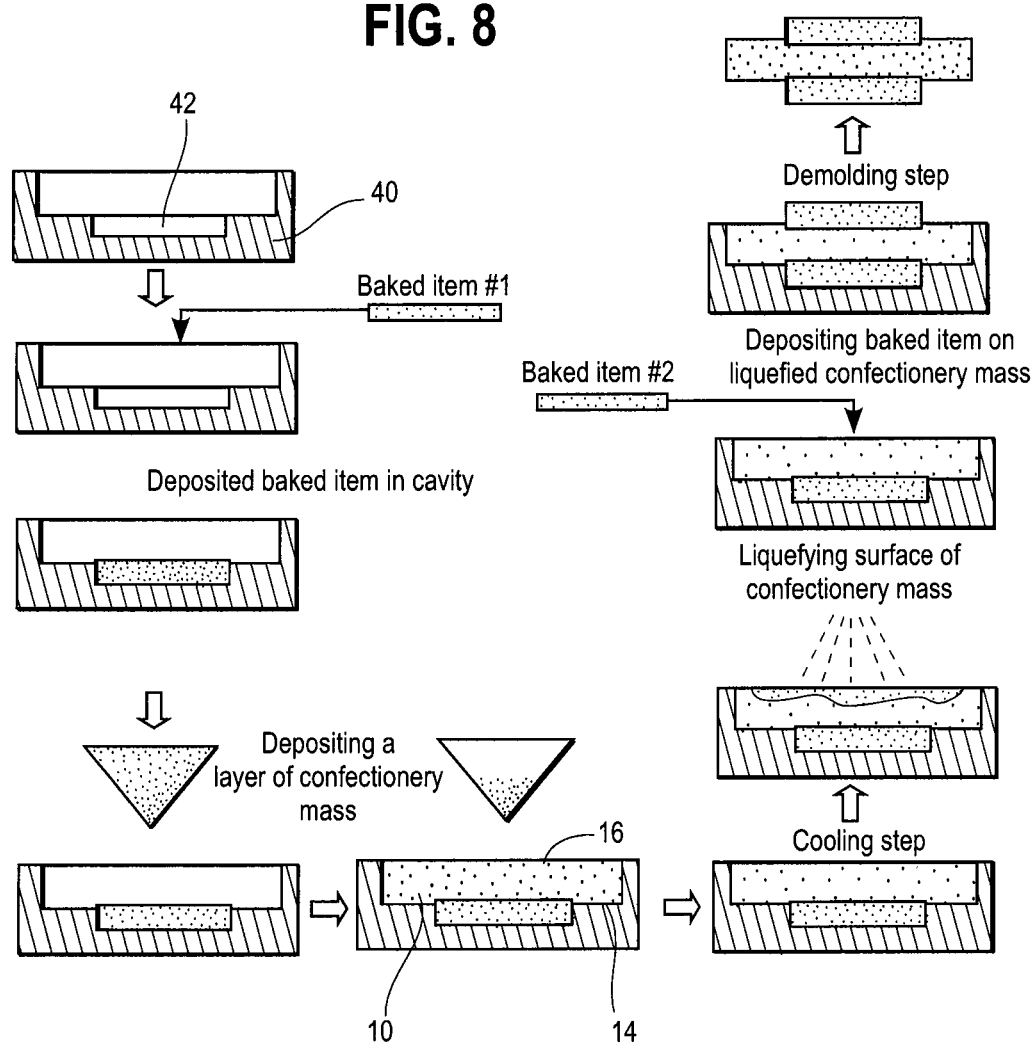
FIG. 8 shows another sequence of production steps that is within the scope of the present disclosure.

FIG. 8 shows another method to produce a food product according to the present disclosure. Here, the mould 40 forming the moulded body 10 comprises a cavity 42 to accommodate a baked item 20 before the food mass is deposited in the mould 40. In other words, the food mass is placed within the mould 40 after the baked item 20 is already positioned within the mould 40 so that an interconnecting interface made out of food mass is created, combining the baked item 20 with the moulded body 10. Depending on the position of the cavity 42 within the mould 40, the baked item 20 can be placed at any position at the moulded body 10.

After the food mass is deposited on top of the baked item 20, the pre-fabricated food product is cooled down to solidify the food mass now forming the moulded body 10. In order to combine the pre-fabricated food product with a further baked item 20 on the side face 16 opposite to the side face 14, on which a baked item 20 is already arranged, the side face 16 of the moulded body 10 is at least partially reheated in order to form a liquid layer of food mass. The liquefied food mass on the moulded body's surface 16 is therefore prepared to receive a baked item 20 placed thereon, preferably while applying some pressure. Here, the food mass forms the interface that attaches the baked items 20 to the moulded body 10.

After another cooling step, basically solidifying the food product 1, the food product 1 is demoulded from the mould 40. The finished product may then be directly flowpacked or transferred to other production steps in order to produce the final product.

Figure 9:
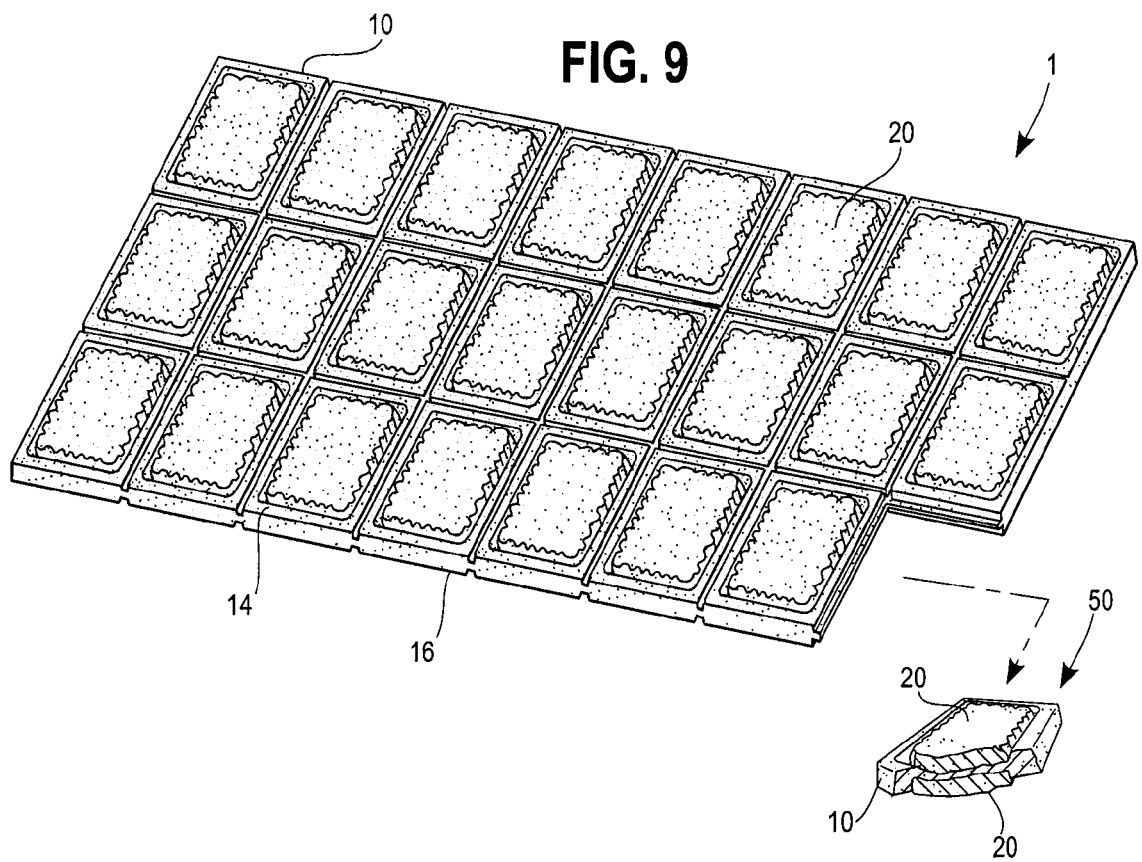
FIG. 9 shows another food product according to the present disclosure.

FIG. 9 shows a food product 1 with baked items 20 arranged in an array on opposing side surfaces 14, 16 of the moulded body 10. A piece 50 having two opposing baked items 20 and a portion of the moulded body situated in between has been broken off from the rest of the food product and may be considered a consumable unit. The baked items are partially embedded in the moulded body on either side of the moulded body. The thickness of the moulded body 10 thus varies, with the thickness being decreased, by, e.g., 40% to 90%, 60% to 80%, or another desired amount, between the partially embedded baked items 20, and with the moulded body extending laterally beyond the baked items on all sides. The moulded body may comprise chocolate, and in the embodiment of FIG. 9 is symmetrical about a horizontal plane. The top and bottom surfaces of the moulded body may contact the baked items, or may be separated therefrom by a small gap.

It will be understood that various changes in the details, materials, and arrangements of the process, formulations, and ingredients thereof, which have been herein described and illustrated in order to explain the nature of the method and resulting food product, may be made by those skilled in the art within the principle and scope of the embodied method as expressed in the appended claims.

The invention claimed is:
1. A food product, comprising:
a plurality of pieces of a molded chocolate body, the pieces of the molded chocolate body having a plurality of gaps therebetween, each of the pieces of the molded chocolate body having an upper side surface and a lower side surface;
a plurality of baked items arranged in an array and in contact with the pieces of the molded chocolate body, the array including at least two baked items within a plane wherein the at least two baked items are separate and spaced apart such that a gap is present between the at least two baked items, wherein adjacent pieces of the molded chocolate body are connected to each other by at least one of the at least two baked items, wherein each of the at least two baked items connecting the adjacent pieces of the molded chocolate body has a top surface and a bottom surface, and wherein each of the at least two baked items has one portion including portions of the top surface and the bottom surface located inside of one of the adjacent pieces of the molded chocolate body and an opposite portion including other portions of the top surface and the bottom surface located inside of another of the adjacent pieces of the molded chocolate body;

each baked item of the array and portions of the pieces of the molded chocolate body form a consumable unit such that the food product includes an array of consumable units;

wherein at least one portion of the top surface of and at least one portion of the bottom surface of each of the at least two baked items is not covered with the pieces of the molded chocolate body and is visible from at least one side of the food product;

wherein the top surface of each one of the at least two baked items is recessed relative to the upper side surface of the adjacent pieces of the molded chocolate body and the bottom surface of each one of the at least two baked items is recessed relative to the lower side surface of the adjacent pieces of the molded chocolate body; and wherein the pieces of the molded chocolate body of the consumable unit extend beyond a periphery of each baked item of the consumable unit.

2. The food product of claim 1, wherein a gap is present between the periphery of each baked item and a boundary of the consumable unit.

3. The food product according to claim 1, wherein the pieces of the molded chocolate body comprise compound chocolate.

4. The food product according to claim 1, wherein the baked items in the array comprise biscuits, waffles, soft cakes and/or crackers.

* * * * *